United States Patent [19]

Takano

[11] Patent Number: 4,785,517

[45] Date of Patent: Nov. 22, 1988

[54] APPARATUS FOR MANUFACTURING PIPE JOINT PORTIONS

[75] Inventor: Kaoru Takano, Tokyo, Japan

[73] Assignee: Kabushiki Kaisha Flowell, Tokyo, Japan

[21] Appl. No.: 29,660

[22] Filed: Mar. 24, 1987

[51] Int. Cl.⁴ .............................................. B23P 19/02
[52] U.S. Cl. ....................................... 29/235; 29/237; 285/247
[58] Field of Search .......................... 285/247; 81/487; 29/235, 234, 237

[56] References Cited

U.S. PATENT DOCUMENTS

| | | | |
|---|---|---|---|
| 2,660,780 | 12/1953 | Beck | 29/235 |
| 2,916,812 | 12/1959 | Milo | 29/237 |
| 3,111,750 | 11/1963 | Moore et al. | 29/235 |
| 3,653,692 | 4/1972 | Henson | 29/235 X |
| 3,704,704 | 12/1972 | Gonzales | 285/247 X |
| 3,823,462 | 7/1974 | Kanda | 29/234 X |

FOREIGN PATENT DOCUMENTS

| | | | |
|---|---|---|---|
| 1104773 | 4/1961 | Fed. Rep. of Germany | 285/247 |
| 2124698 | 12/1971 | Fed. Rep. of Germany | 285/247 |
| 1187512 | 9/1959 | France | 285/247 |
| 248293 | 10/1947 | Switzerland | 285/247 |
| 356882 | 9/1931 | United Kingdom | 285/247 |

Primary Examiner—Dave W. Arola
Attorney, Agent, or Firm—Cushman, Darby & Cushman

[57] ABSTRACT

A pipe joint in which a force for retaining a semirigid plastic pipe to a joint body is provided in such a manner that an outward expanded portion of the pipe which is formed by inserting an annular shape-retaining member which does not obstruct the flow of fluid into the pipe is connected to the joint body by a box nut. This pipe joint portion is formed by employing an apparatus having a clamp for temporarily fixing the pipe at one end of a base arm, a grip portion disposed at the other end thereof, a toggle lever pivotally attached to the grip portion, a sliding rod engaging at its one end with an end of the toggle lever and capable of moving to the left and right while being supported by a guide base attached to the base arm. The shape-retaining member is inserted into the pipe by this sliding rod.

2 Claims, 11 Drawing Sheets

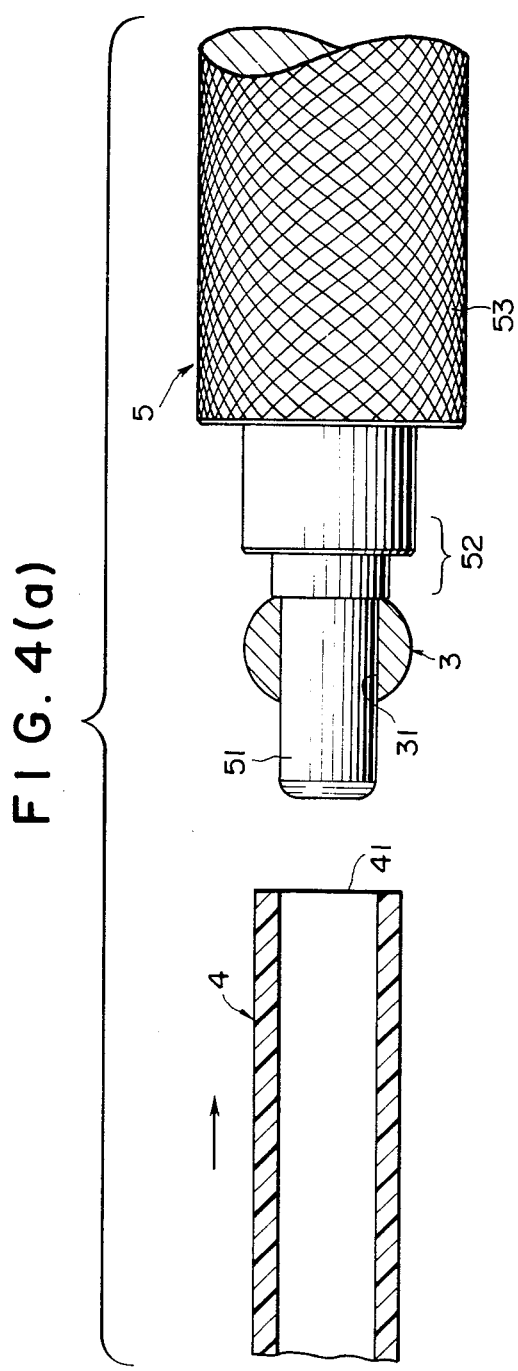

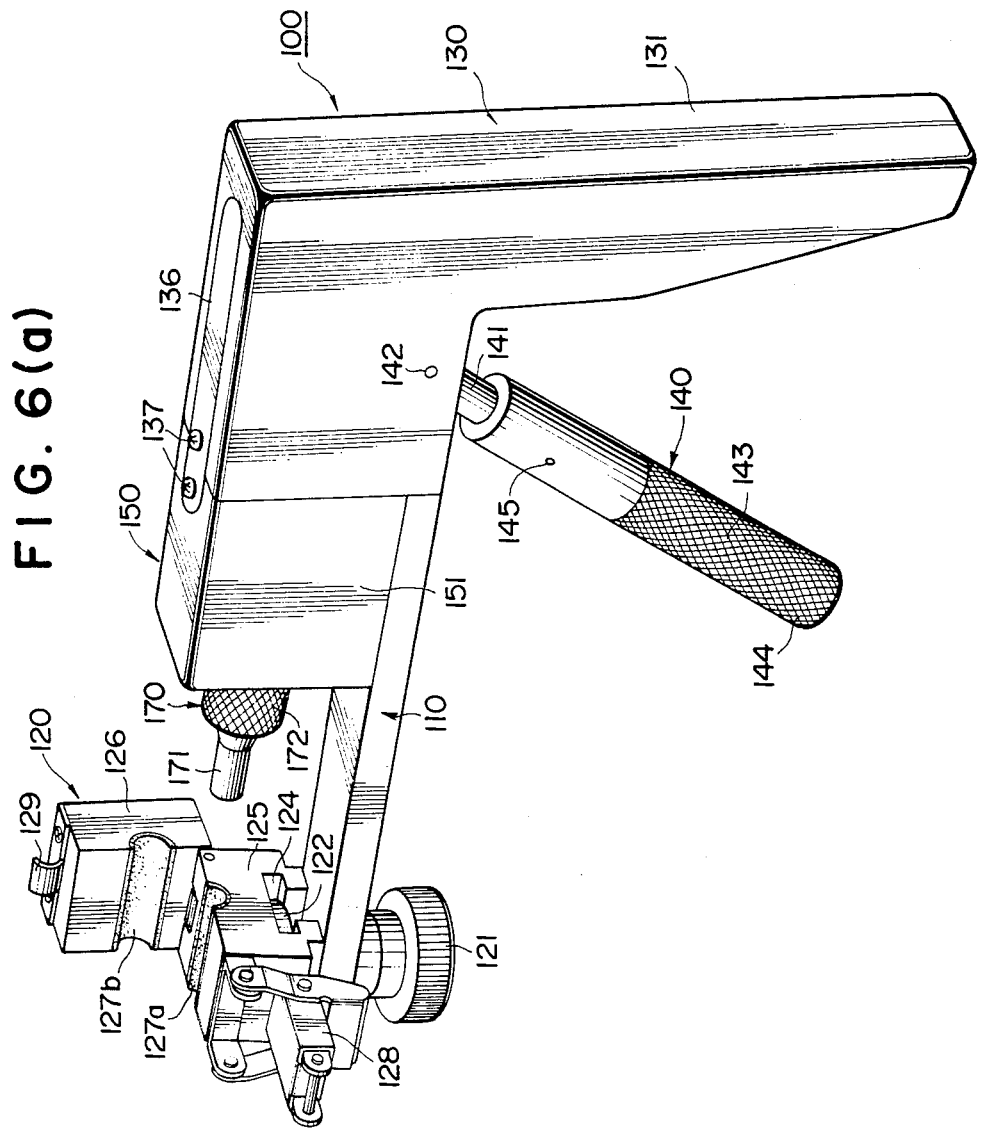

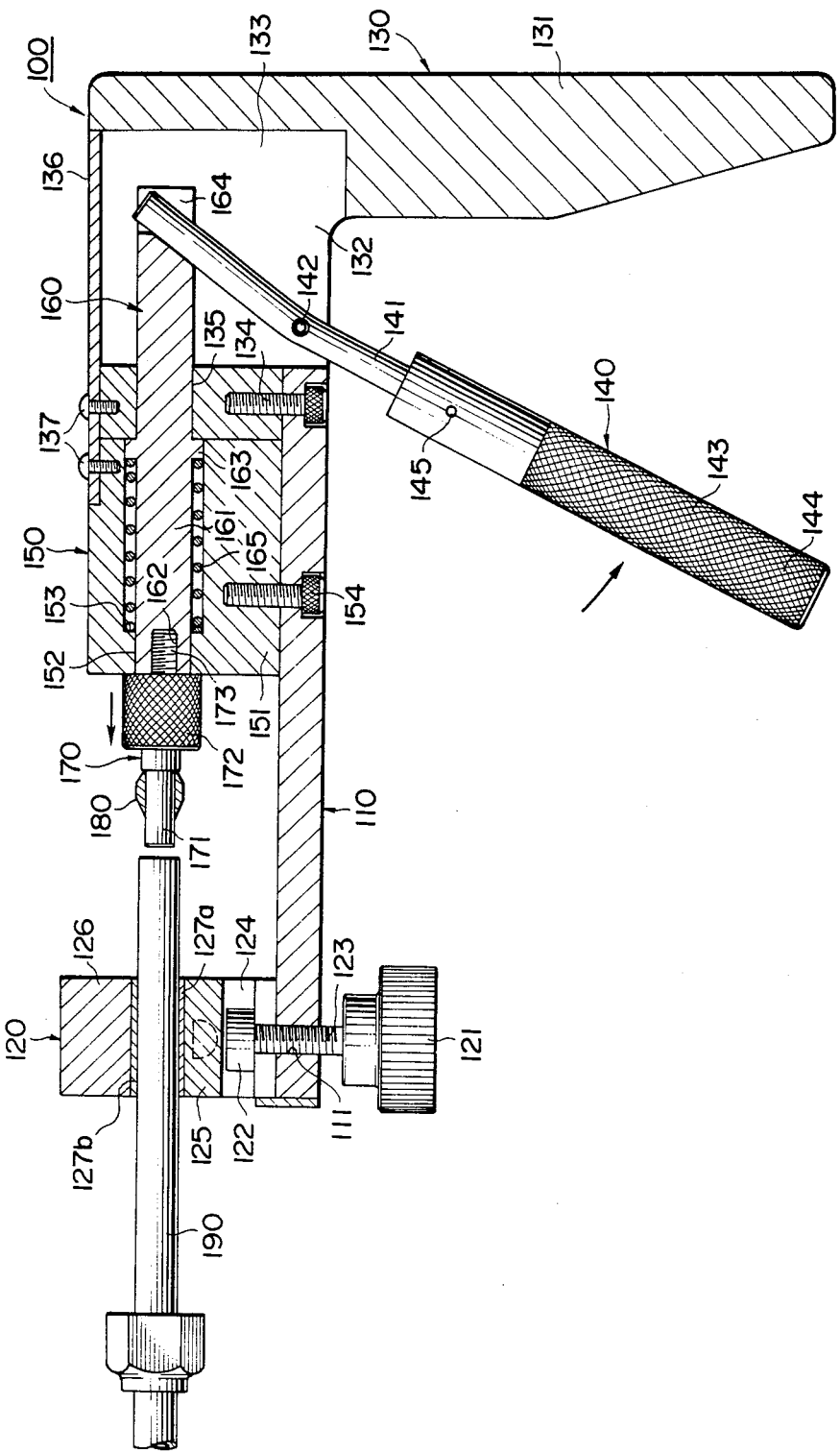

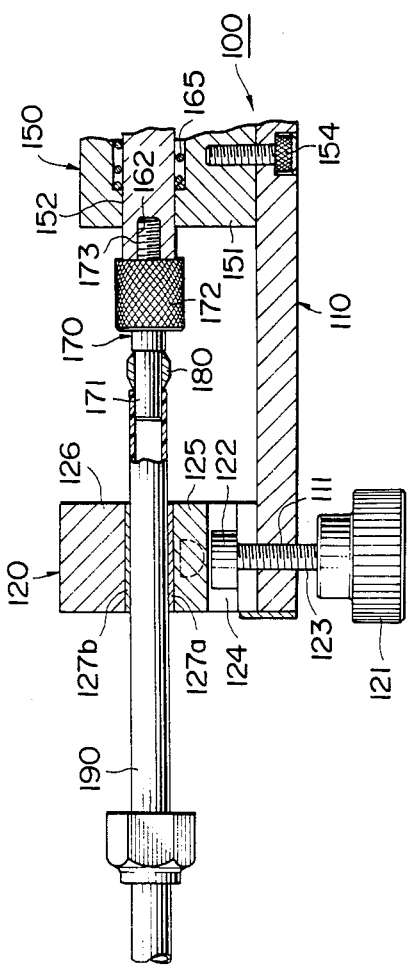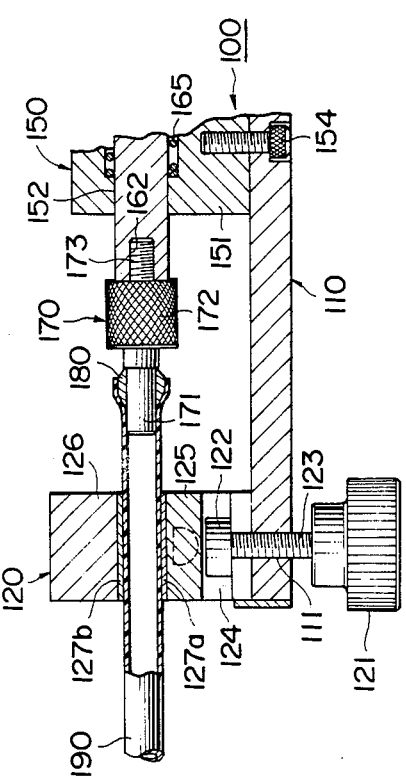
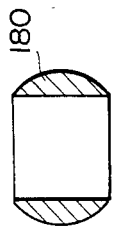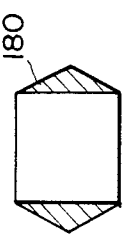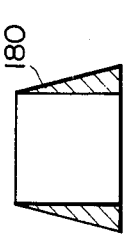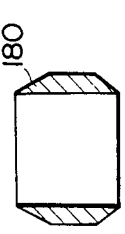

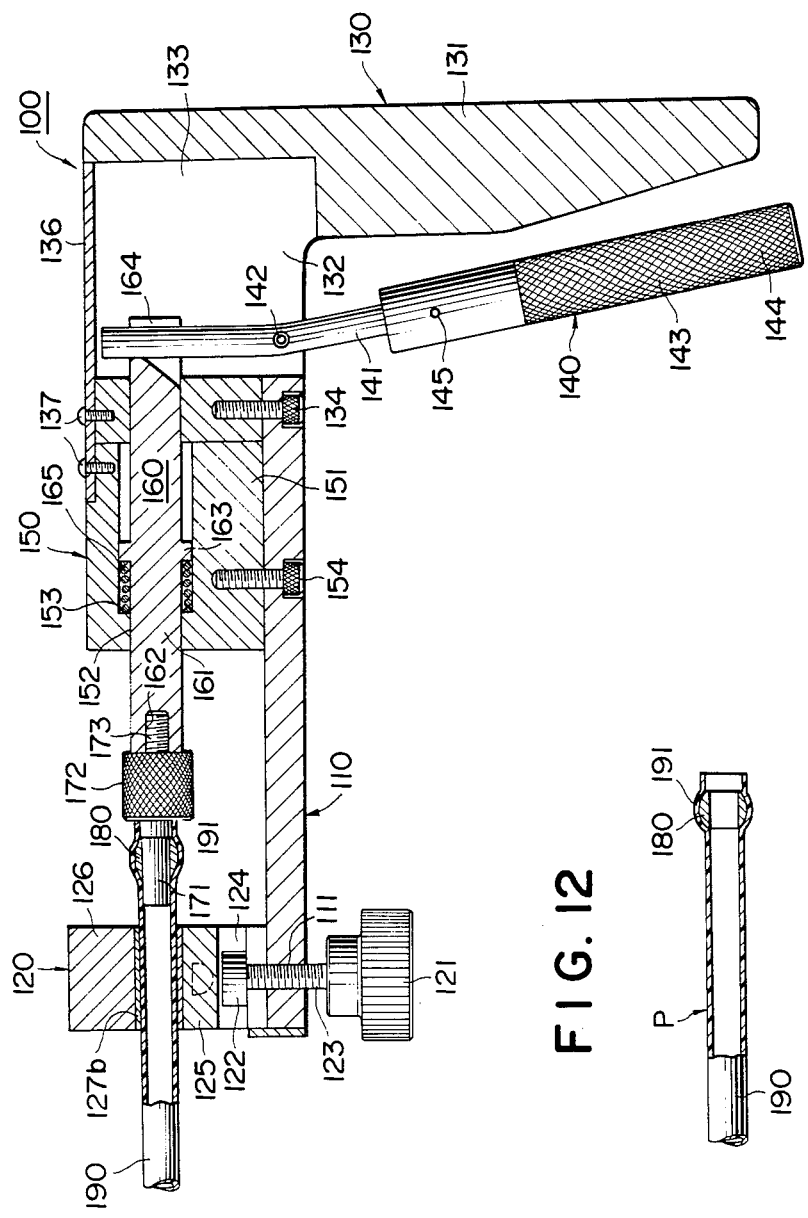

4,785,517

APPARATUS FOR MANUFACTURING PIPE JOINT PORTIONS

BACKGROUND OF THE INVENTION AND RELATED ART STATEMENT

The present invention relates to a pipe joint and an apparatus for manufacturing pipe joint portions, and more particularly to a pipe joint in which a shape-retaining member which does not obstruct the flow of a fluid is inserted into a semirigid pipe made of a synthetic resin to partially expand the pipe and impart to the pipe a force which retaining it in the joint, and in which the pipe thereby prepared is attached to a joint body by means of a box nut, and to an apparatus for forming this type of pipe joint portion by inserting a shape-retaining member into the pipe to form an expanded portion.

Traditionally, a semirigid pipe made of a fluoroplastic which has a chemical-resistant properties and a high degree of lubricity is attached to a joint body in such a manner that a taper ring, such as one having a wedge-shaped cross-sectional configuration, is attached by a box nut to the outer periphery of an end of the pipe in which a groove is formed, and this ring is pressed against the peripheral surface of the pipe under pressure and is deformed by utilizing an inner slanting surface formed on the joint body and an upper inner surface of the box nut, thereby connecting the pipe to the joint body.

In this case, the taper ring is press-fitted to the pipe, but this joint does not display a large retaining force against tensile forces acting in the longitudinal direction of the pipe because the pipe is made of a synthetic resin such as a fluoroplastic and has a high degree of lubricity. Therefore, if the pipe or a device connected to this pipe by the joint is moved in the direction opposite to that in which the pipe and the joint body abut against each other so that a tensile force is applied thereto in this direction, there is the danger of a major accident occurring, caused by fluid flowing through the pipe being released by the disconnection of the pipe. Moreover, when the groove is formed on the pipe, a sufficient level of accuracy in finishing cannot always be obtained, and a reduction in the accuracy may result in a leak. There is also a possibility of the pipe being disconnected if the top end of the ring is deformed and disengaged from the groove by an extremely large tensile force, since this type of taper ring displays a low degree of mechanical strength.

OBJECT AND SUMMARY OF THE INVENTION

It is therefore an object of the present invention to provide an improved joint formed by inserting a shape-retaining member which does not obstruct the flow of a fluid into the pipe to partially expand the pipe and increase the force whichretains the pipe to the pipe joint, thereby improving the connection between the pipe and the pipe joint.

It is another object of the present invention to provide an apparatus for safely and positively inserting this shape-retaining member into the pipe.

The present invention provides, in one of its aspects, a pipe joint comprising a joint body, a box nut for attaching a semirigid pipe made of a synthetic resin to the joint body, and an annular shape-retaining member which is inserted into the pipe from one end thereof to partially expand the pipe outward and which does not obstruct the flow of a fluid in the pipe after it has been inserted.

The present invention provides, in another of its aspects, an apparatus comprising a pipe clamp for temporarily fixing the pipe at one side of a base arm, a grip portion disposed at the other side thereof, a toggle lever pivotally attached to the grip portion, a sliding rod engaging at its one end with an end of the toggle lever and capable of moving to the left and right while being supported by a guide base attached to the base arm, and a feed member for supplying the shape-retaining member attached to the other end of the sliding rod into the pipe clamped by the pipe clamp.

BRIEF DESCRIPTION OF THE DRAWINGS

All accompanying drawings show embodiments of the present invention.

FIGS. 4(a) to 4(c) are cross-sectional views of the deformation of the pipe during the procedure of inserting the shape-retaining member into the pipe;

FIGS. 6(a) and 6(b) are perspective views of different states of an apparatus in accordance with the present invention;

FIG. 7 is a cross-sectional view of the apparatus shown in FIG. 6;

FIGS. 8(a) to 8(d) are cross-sectional views of examples of the shape-retaining member;

FIGS. 11(a) to 11(c) are illustrations of states in which the shape-retaining member is inserted into the pipe; and FIG. 12 is a cross-sectional view of the pipe in the state in which the shape-retaining member has been inserted into the pipe.

DETAILED DESCRIPTION OF PREFERRED EMBODIMENTS

Figure 1:
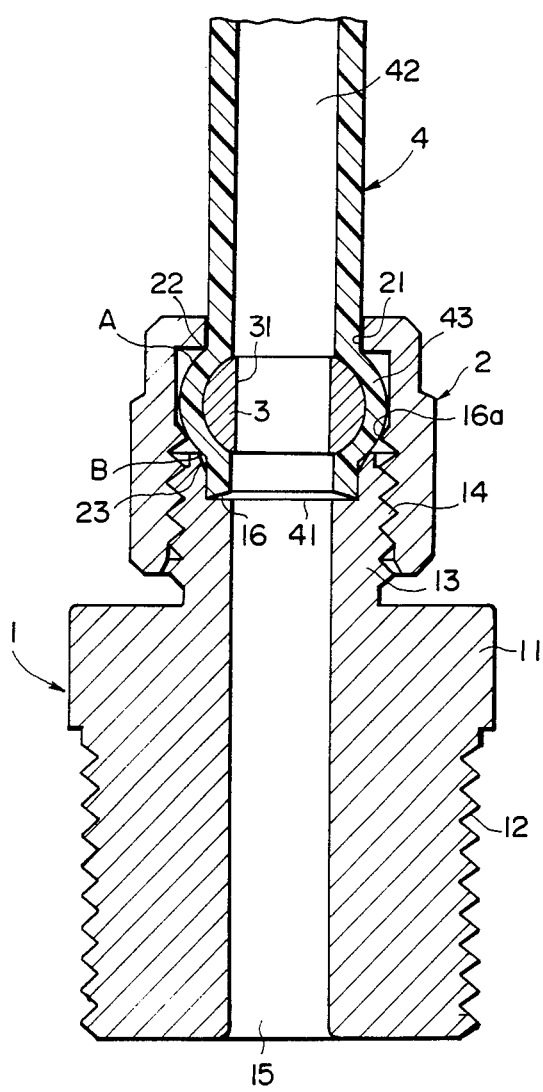
FIG. 1 is a cross-sectional view of a joint body and a pipe connected to the joint body.

As shown in FIG. 1, a pipe joint in accordance with the present invention is provided with a joint body 1 which has a threaded portion 12 formed on a large-diameter portion 11 and which can be screwed into a mating device (not shown), a threaded portion 14 formed on a small-diameter portion 13 in such a manner that a box nut 2 for attaching a semirigid fluoroplastic pipe 4 can be screwed onto this threaded portion 13, a through hole 15 which passes through the large-diameter and small-diameter portions 11 and 13 at the center thereof, and a circular recess 16 formed at the end of the small-diameter portion in such a manner such as to be that it is concentric with the through hole and has an inside diameter equal to the outside diameter of the pipe 4. The joint also has: a box nut having at one end a straight hole whose inside diameter is substantially equal to the outside diameter of the pipe 4, a clamping rectangular edge 22 continuing from this straight hole, and a tapped opening 23 continuing from the rectangular edge 22 and which is adapted to be screwed onto the threaded portion 14 formed on the small-diameter portion 13 of the joint body 1; and a shape-retaining member 3 which is roughly in the form of a ball whose outside diameter is larger than the inside diameter of the fluoroplastic pipe 4 which is to be connected to the joint body 1 by means of the box nut 2, and which has at its center a through hole 31 whose inside diameter is substantially equal to that of the pipe 4.

Figure 2:
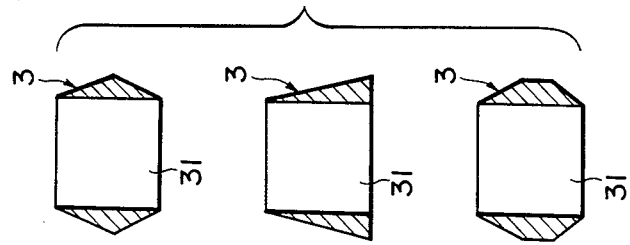
FIG. 2 is a cross-sectional view of examples of pipe deformation.

As shown in FIG. 2, the shape-retaining member 3 may have a double frustoconical, a frustoconical or annular form instead of the ball-like form. The shape retaining member 3 is made of the same material as that of the pipe 4, or of a harder material.

The pipe joint in accordance with the present invention can be constituted by these components, and the procedure of connecting the pipe 4 to the joint body 1 by using the box nut 2*a*and the shape-retaining member 3 will be described below.

Figure 3B:
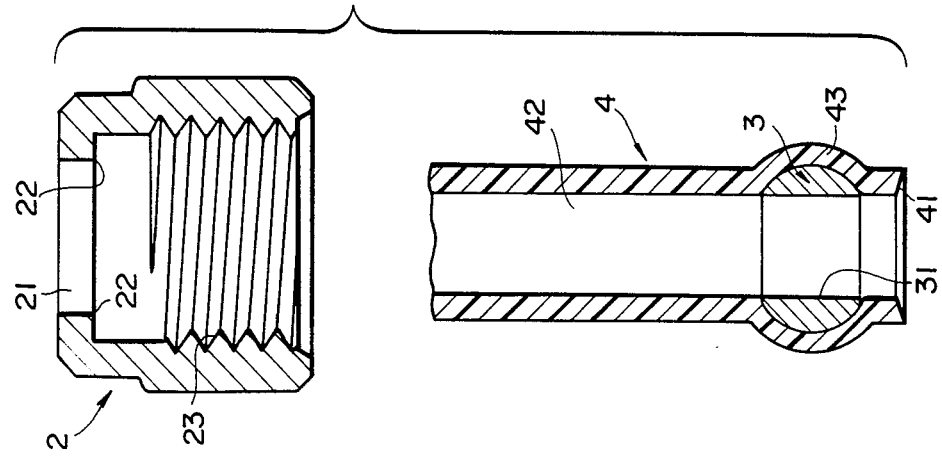
FIGS. 3(a) and 3(b) are cross-sectional views of the states of the pipe before and after the insertion of a shape-retaining member into an end of the pipe.
Figure 3A:
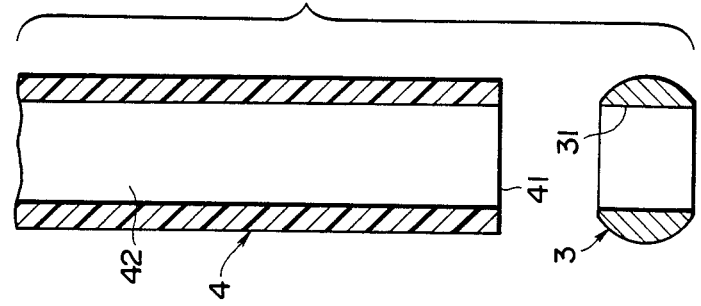
Figure 4B:
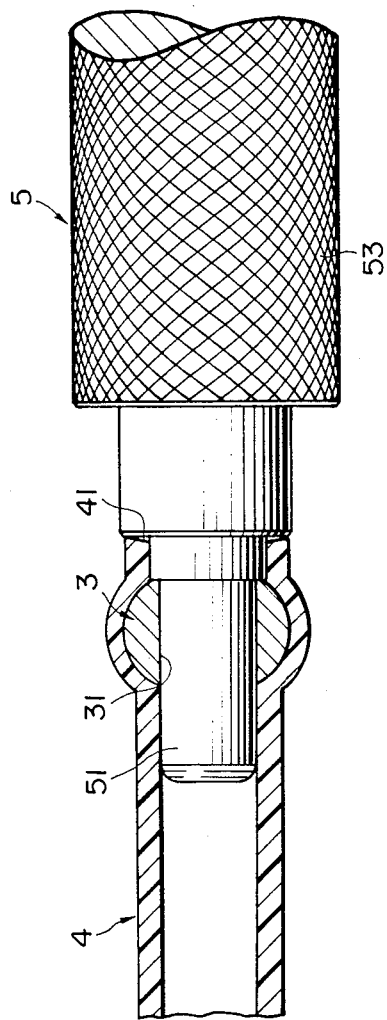
Figure 4C:
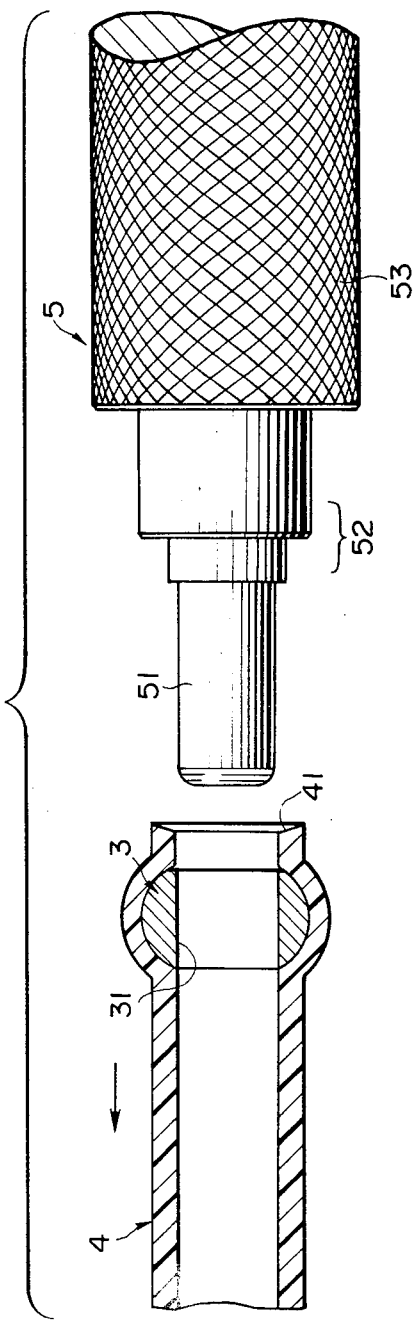

As shown in FIG. 3(*a*), the shape-retaining member 3 is inserted into the fluoroplastic pipe 4 from the end 41 thereof, using a fitting tool 5 which has, as shown in FIGS. 4(*a*) to (*c*), a shape-retaining member fitting portion 51 whose outside diameter is substantially equal to the inside diameter of the through hole 31 of the shape retaining member 3, a stepped stopper 52 whose diameter is slightly larger than the inside diameter of the through hole 31, and a grip portion 53 with a knurled non-slip outer surface. The shape retaining member fitting portion 51 is first inserted into the through hole 31 of the shape retaining member 3, as shown in FIG. 4(*a*). The shape retaining member 3 and a part of the fitting tool 5 from the top to the step between the smaller-diameter and larger diameter portions thereof are thereafter inserted from the end 41 into a bore 42 of the pipe 4, as shown in FIG. 4(*b*), by expanding the pipe 4 which has previously been softened by a heat gun or the like. When the end 41 of the pipe 4 contacts the larger-diameter portion of the stopper 52, the fitting portion is removed from the shape-retaining member 3, thus inserting the shape-retaining member 3 from the end 41 of the pipe 4 to a desired position. After contraction and setting of the pipe, an expanded portion 43 is formed by the shape-retaining member 3 in the vicinity of the end of the pipe, as shown in FIG. 4(*c*).

Figure 5:
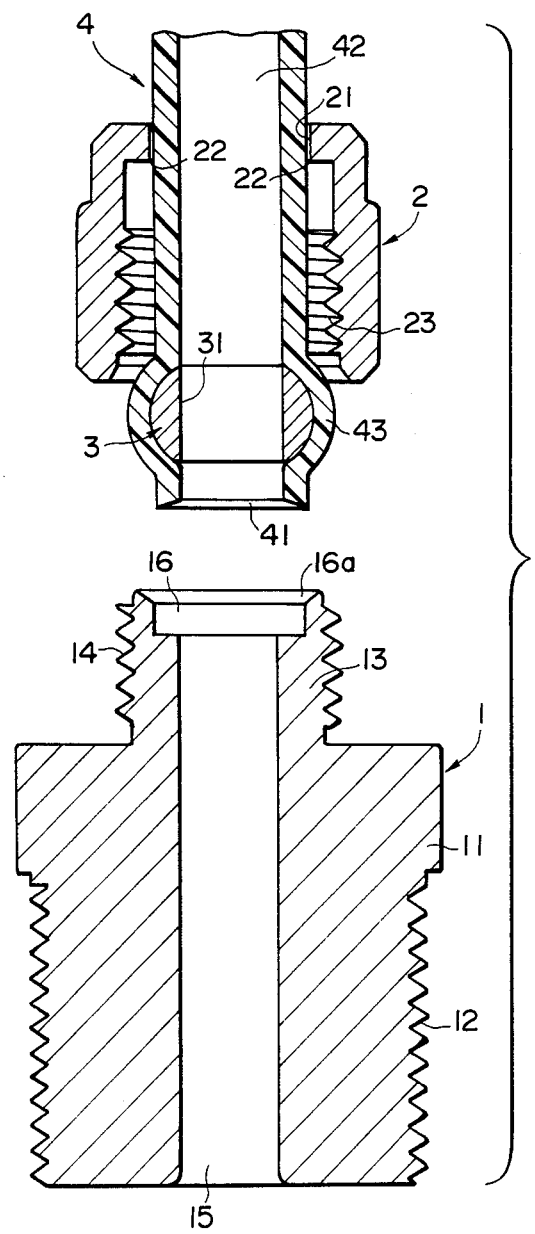
FIG. 5 is a cross-sectional view of the pipe ready to be attached to the joint body after the expansion.

When the pipe 4 which has the expanded portion 43 formed in this manner to be connected to the joint body and which has been inserted at its other end into the box nut 2, as shown in FIG. 3(*b*) and FIG. 5, is also connected at the other end to another device, another box nut is preliminarily fitted around the pipe from the other end, and a second expanded portion 43 is formed at this end by another shape-retaining member 3 in the same manner. The end 41 of the pipe 4 is thereafter fitted into the recess 16 of the joint body 1, and the box nut is screwed onto the threaded portion 14 of the small-diameter portion 13.

The upper side of the expanded portion 43 is thereby brought into contact with the rectangular edge 22 of the box nut 2 while the lower side is brought into contact with a tapered edge 16*a* of the recess 16, and the pipe is connected to the joint body with sealing effect provided therebetween.

The pipe 4 is compressed from the outside and from the inside between a portion A of the pipe which is in contact with the rectangular edge 22 and a portion B which is in contact with the tapered edge 16*a*. The portion A into which the edge is bitten resists a tensile force acting on the pipe toward the other end, and the portion B stops a leak through a gap between the wall of the recess and the outer peripheral surface of the pipe.

Figure 6B:
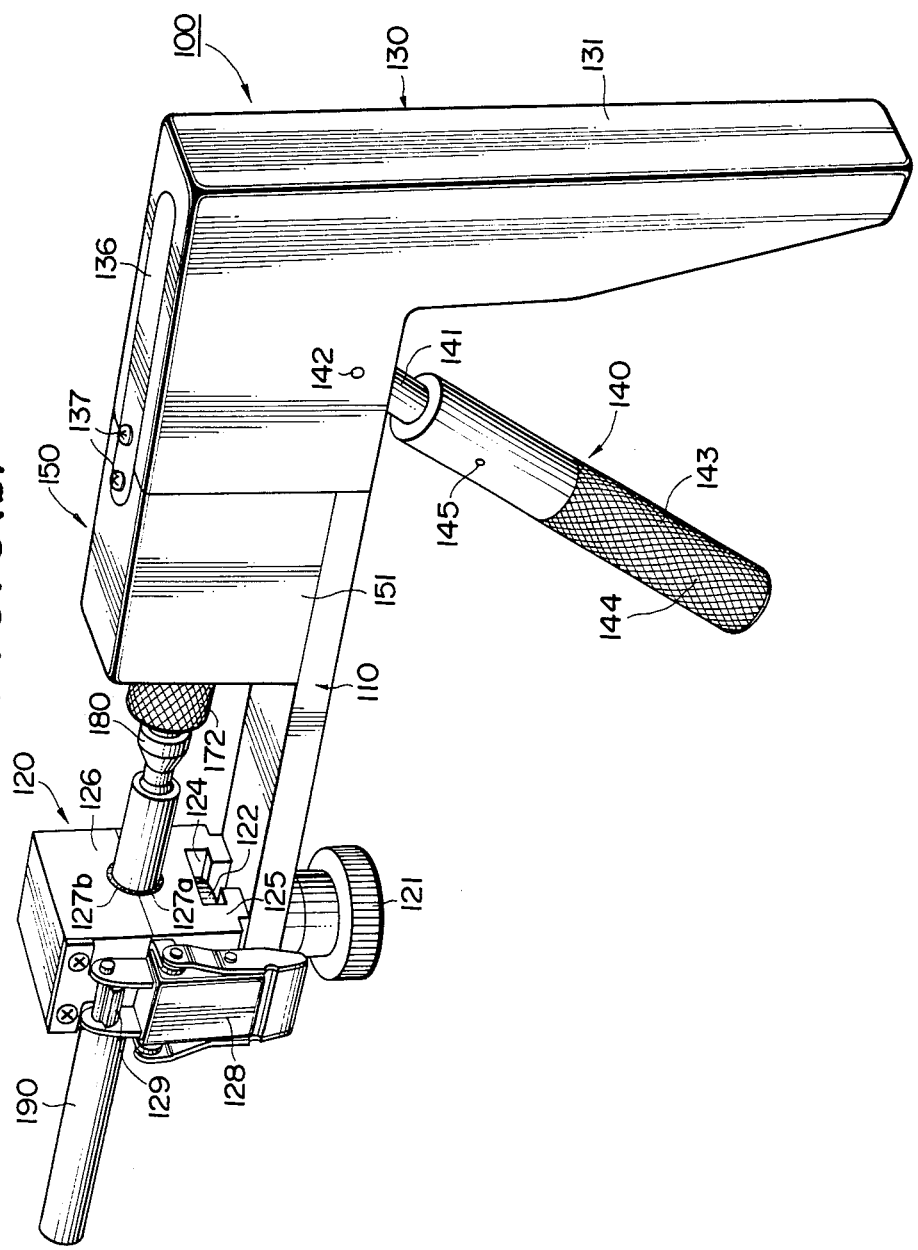

An apparatus for preparing pipe joint portions in accordance with the present invention will now be described. As shown in FIGS. 6(*a*), 6(*b*) and 7, a mounting screw 123 having at one end a knob 121 and at the other end a pressing piece 122 is mounted in a tapped hole 111 formed at one end of a base arm 110 in the form of a plate, and a the pressing piece 122 of the mounting screw is inserted into a dovetail groove 124 of a clamp base 125, thereby detachably mounting the clamp base 125 on the base arm in such a manner that the clamp base 125 is movable to a slight extent in the longitudinal direction of the base arm. A clamp block 126 is supported by a hinge means on this clamp base at one side thereof such as to hinge thereon and is fixed on the clamp base when a metal engaging member 128 attached to the clamp base at the other side is engaged with a hook member 129 disposed on the clamp block 126. The clamp base 125 and the clamp block 126 constitute a pipe clamp 120. Semicircular pinching grooves 127*a* and 127*b* are respectively formed in the clamp base 125 and the clamp block 126.

A generally L-shaped grip member 131 having a hollow inner space 132 which passes through it in the vertical direction as viewed in FIGS. 6 and 7 is mounted on the base arm 110 at the other end by a mounting screw 134, thereby forming a grip portion 130. A main lever member 141 which is bent by a small angle to have two linear portions is pivotally supported at its bent portion by a supporting shaft 142 between the side walls 133 which define the inner space 132. A toggle lever 140 to which a finger-receiving member 143 which has a knurled non-slip peripheral surface 144 is fixed by a pin 145 is attached to one end of the main lever member 141. A cover plate 136 is attached by screws 137 to close the upper opening of the inner space 132.

A guide block 151 which forms a guide base 150 is attached to the base arm 110 by screws 154 in a position adjacent to the grip portion 130. The guide block 151 has a guide hole 152 with a stepped portion 153 formed in a position near one end of the guide base between a longer bore and a shorter bore, the diameter of the shorter bore being slightly smaller than that of the longer bore. A sliding rod 160 is inserted into the guide hole 152 formed in the guide block 151 and the guide hole 135 passing from the end surface of the grip 131 to the inner space 132 with a spring 165 interposed between the inner surface of the guide hole 152 and the rod body 161 of the sliding rod 160. The sliding rod 160 has a tapped hole 162 formed at one end of a rod body 161, a flange 163 formed at the center of the sliding rod, and a split groove 164 which is formed at the other end and which is engaged with the top end of the main lever member 141. An inserting member 170 having a stepped insertion rod 171 extending from one end of a knob portion 172 knurled in the peripheral surface thereof, and a threaded rod 173 extending from the other end is screwed at this threaded rod into the tapped hole 162 of the sliding rod.

Figure 9A:
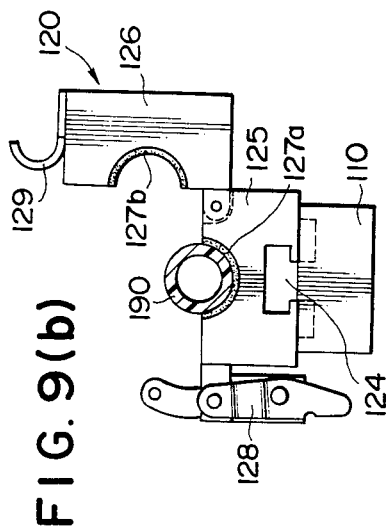
FIG. 9(a) is a side view of pipe clamps before the operation of clamping the pipe.
Figure 9B:
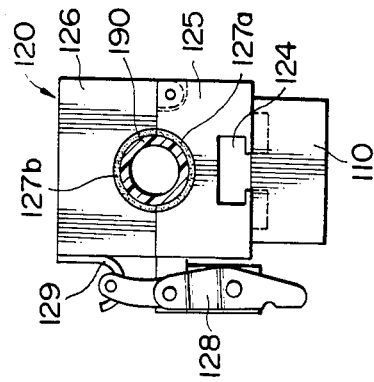
FIG. 9(b) is a front view of a pipe clamp with a section of the pipe, taken along the line A—A of FIG. 9(a)
Figure 10A:
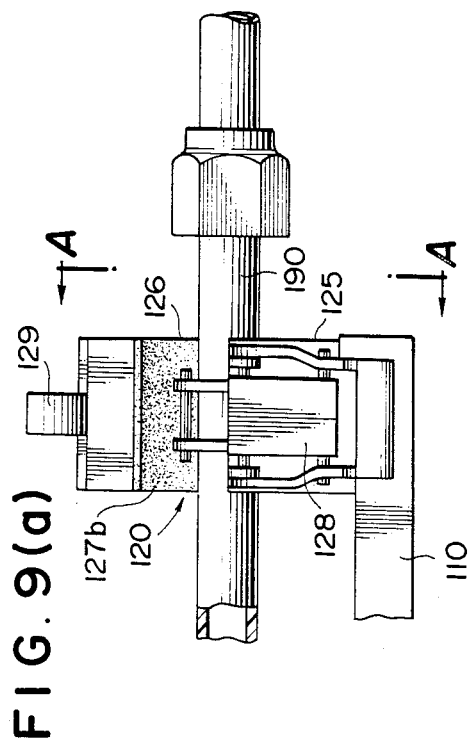
FIG. 10(a) is a side view of the pipe clamp in the state in which the pipe is clamped in the clamp.
Figure 10B:
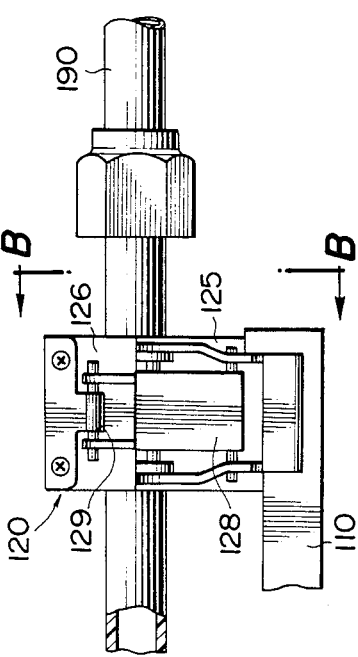
FIG. 10(b) is a front view of the pipe clamp with a section of the pipe, taken along the line B—B of FIG. 10(a)

The apparatus 100 for preparing the pipe joint portions in accordance with the present invention is thus constructed. When one of annular shape-retaining members 180, such as shown in FIGS. 8(a) to 8(d), is inserted into a semirigid fluoroplastic pipe 190 by employing this apparatus, the engaging metal member 128 is first disengaged from the hook metal member 129, as shown in FIGS. 6(a), 9(a) and 9(b), the clamp block 126 is turned over about the hinge, and the pipe 190 is placed in the pinching groove 127a of the clamp base 125 in such a manner that the end of the pipe is positioned within the range of the stroke of the sliding rod 160. The clamp block 126 is thereafter closed, and the engaging metal member 128 is engaged with the hook metal member 129, thereby clamping the pipe, as shown in FIGS. 7, 10(a) and 10(b).

Then the shape retaining member 180 is attached to the insertion rod 171 of the inserting member 170, and the operator grasps the grip 130 and strongly pulls the toggle lever 140 against the resilient force of the spring 165 from the state shown in FIG. 7, thereby inserting the insertion rod 171 into the pipe 190 from the end thereof, as shown in FIG. 11(a). Successively, the shape-retaining member 180 is inserted into the pipe while expanding the pipe by the shape-retaining member 180, as shown in FIG. 11(b), until the end of the pipe 190 contacts the knob portion 172. The toggle lever 140 is thereafter returned to the state before this work as shown in FIG. 6(a) by the resilient force of the spring 165 and the physical force of the operator. The shape-retaining member 180 is thereby left in the pipe 190, and an expanded portion 191 is formed by the shape-retaining member 180 in a desired position near the end of the pipe 190, thereby obtaining a finished article P such as shown in FIG. 12. Since the pipe clamp 120 and inserting member 170 are detachable from the base arm 110 and the sliding rod 160, they may be replaced with other suitable types in accordance with the size of the pipe.

As described above, the pipe joint in accordance with the first aspect the present the invention is constituted by a joint body, a box nut for attaching a semirigid plastic pipe to the joint body, and an annular shape-retaining member which is forcibly inserted into the pipe from one end thereof to partially expand the pipe outward and which does not obstruct the flow of fluid in the pipe after it has been inserted. The pipe is thereby securely connected to the joint body, and the connection between the pipe and the joint body is improved in the strength and sealing properties thereof without using any special sealing member.

The apparatus in accordance with the second aspect of the present invention has the pipe clamp 120 for temporarily fixing the pipe 190 at one side of the base arm 110, the grip 130 disposed at the other side thereof, the toggle lever 140 pivotally attached to the grip, the sliding rod 160 engaging at its one end with an end of the toggle lever and capable of moving to the left and right while being supported by the guide base attached to the base arm, and the inserting member 170 for supplying the shape-retaining member 180 attached to the other end of the sliding rod into the pipe clamped by the pipe clamp. The shape-retaining member can be easily inserted and fitted into the pipe with a constant accuracy by the power-boosting function of the toggle lever, and the pipe can be worked by operating this apparatus by one hand even in narrow work space in the field.

What is claimed is:

1. Apparatus for inserting an annular shape-retaining member having a throughbore with a given inner diameter and
a bulged outer surface having a maximum outer diameter which is greater than said given diameter and a given length, in a throughbore of a semirigid, forcibly radially distensible tubular pipe having a throughbore with an internal diameter, when unstretched, which is approximately the equal to said given diameter, a given distance into said throughbore of said pipe from an open end of the pipe to become located at a predetermined site, so that said throughbore of said annular shape-retaining member acts as a substantially non-constricting axially intermediate, axially aligned continuation of said throughbore of said pipe,
said apparatus comprising:
an axially extending base arm having first and second opposite ends;
an openable-closable pipe clamp mounted on said first end of said base arm and arranged for temporarily externally gripping the pipe at a gripping site located axially beyond said predetermined site;
a handgrip disposed on said second end of said base arm and arranged to be manually gripped by a user;
a toggle lever pivotally attached at a pivot joint to said grip so as to have a lower portion thereof below said pivot joint be squeezable toward a lower portion of said handgrip, for forwardly moving an upper portion of said toggle lever located above said pivot joint;
an inserting member, said inserting member including an elongated rod reciprocably mounted on said base arm for axial movement towards and away from said pipe clamp, said inserting member having a rear end portion engaged with said upper portion of said toggle level to be moved axially forwards thereby, so that squeezing of the lower portion of said toggle lever towards the lower portion of said handgrip causes said elongated rod to be axially thrust towards said pipe clamp;
said inserting member including a leading end portion having a shape-retaining member fitting portion which is cylindrical and has an external diameter approximately equal to said given diameter but is longer than said given length, axially adjacent a radially-stepped stopper portion of abruptly larger external diameter than said given diameter, whereby the annular shape-retaining member can be inserted in the throughbore of the pipe by inserting the pipe in the pipe clamp with said end of said pipe protruding towards, and disposed in axial alignment with said leading end portion of said inserting member, closing the pipe clamp to secure the pipe to the base arm, sliding the annular shape-retaining member onto the inserting member until an end of the annular shape-retaining member abuts said stopper portion, squeezing said lower portion of said toggle lever towards said lower portion of said handgrip so that said leading end portion axially forwardly of said annular shape-retaining member first enters said throughbore of said pipe through said end and, upon further squeezing of said lower portion of said toggle lever towards said lower portion of said handgrip said annular shape-retaining member is forcibly carried into said throughbore of said pipe to said predetermined site, whereupon said inserting member is axially withdrawn, leaving behind said annular shape-retaining member at said site, whereupon said pipe clamp may be opened to free said pipe from said apparatus.

2. The apparatus of claim 1, wherein:
said pipe clamp is mounted on said first end of said base by adjustable means which permit the pipe clamp to be fixed at selectable locations for longitudinally varying said gripping site on the pipe.

* * * * *